(12) United States Patent
Kubota et al.

(10) Patent No.: US 7,195,366 B2
(45) Date of Patent: Mar. 27, 2007

(54) BACKLIGHT UNIT OF LIQUID CRYSTAL DISPLAY DEVICE AND REFLECTIVE MEANS THEREIN

(75) Inventors: Yoji Kubota, Nagano-ken (JP); Toshio Matsui, Nagano-ken (JP)

(73) Assignee: LG. Philips LCD Co., Ltd., Seoul (KR)

( * ) Notice: Subject to any disclaimer, the term of this patent is extended or adjusted under 35 U.S.C. 154(b) by 240 days.

(21) Appl. No.: 10/897,427

(22) Filed: Jul. 23, 2004

(65) Prior Publication Data

US 2005/0041173 A1    Feb. 24, 2005

(30) Foreign Application Priority Data

Jul. 25, 2003    (JP)    ............. P 2003-280456

(51) Int. Cl.
*G09F 13/04*    (2006.01)

(52) U.S. Cl. .................. 362/97; 362/33; 362/561; 349/113

(58) Field of Classification Search .......... 362/33, 362/97, 561
See application file for complete search history.

(56) References Cited

U.S. PATENT DOCUMENTS

| | | | | |
|---|---|---|---|---|
| 1,900,551 | A | * | 3/1933 | Guth ............... 362/348 |
| 5,224,770 | A | * | 7/1993 | Simmons et al. ....... 362/29 |
| 6,407,781 | B2 | * | 6/2002 | Kitada ............... 349/58 |
| 6,491,411 | B2 | * | 12/2002 | Itoh ................ 362/246 |
| 6,767,113 | B2 | * | 7/2004 | Yao ................. 362/297 |
| 6,871,979 | B2 | * | 3/2005 | Mai ................. 362/241 |
| 6,913,378 | B2 | * | 7/2005 | Ho .................. 362/560 |
| 2004/0062034 | A1 | * | 4/2004 | Hsieh et al. ......... 362/97 |

FOREIGN PATENT DOCUMENTS

| | | |
|---|---|---|
| JP | 62273505 | 11/1987 |
| JP | 05-100223 | 4/1993 |
| JP | 05-159609 | 6/1993 |
| JP | 06-000951 | 1/1994 |
| JP | 06-041005 | 2/1994 |
| JP | 7114026 | 5/1995 |
| JP | 2001-229725 | 8/2001 |
| JP | 2001297613 | 10/2001 |
| JP | 2003-156610 | 5/2003 |
| JP | 2003156610 | 5/2003 |

* cited by examiner

*Primary Examiner*—Ali Alavi
*Assistant Examiner*—Hargobind S. Sawhney
(74) *Attorney, Agent, or Firm*—Morgan, Lewis & Bockius, LLP

(57) ABSTRACT

A backlight unit of a liquid crystal display device includes a light source and a reflective means, the reflective means having a plurality of sloping reflective surfaces for reflecting light emitted from the light source to a light-irradiation surface of a liquid crystal panel at an angle of about 30° or less with respect to a line perpendicular with the light-irradiation surface of the liquid crystal panel thereby to improve light efficiency.

18 Claims, 3 Drawing Sheets

BACKLIGHT UNIT OF LIQUID CRYSTAL DISPLAY DEVICE AND REFLECTIVE MEANS THEREIN

The present invention claims the benefit of Japanese Application No. P2003-280456 filed in Japan on Jul. 25, 2003, which is hereby incorporated by reference.

BACKGROUND OF THE INVENTION

1. Field of the Invention

The present invention relates to a liquid crystal display (LCD) device, and more particularly, a backlight unit of an LCD device and reflective means therein that have an improved light efficiency.

2. Discussion of the Related Art

LCD devices have been actively developed as flat display panels in laptop computers, desktop computers, and large-sized information displays because of their high quality image, lightness, small thickness, compact size, and low power consumption. Most LCDs are passive devices in which images are displayed by controlling an amount of light input from an outside light source. Thus, a separate light source (backlight unit) is generally employed for irradiating an LCD device.

There are two types of backlight units, an edge-light type and a direct type, based on an arrangement of a light source within the unit. An edge-light type backlight unit has a light source installed at a side portion of a light guiding plate for guiding light. Further, the light source includes a lamp for emitting light, a lamp holder inserted at both ends of the lamp for protecting the lamp, and a lamp reflective plate for enclosing an outer circumference of the lamp, such that the reflective plate reflects the light generated from the lamp toward the light guiding plate. The edge-light type backlight units are commonly employed in small-sized LCD devices because their compactness.

However, a direct type backlight unit generally provides a higher luminance than an edge-light type backlight unit and as the trend of large-size LCD devices grows, the applications of the direct type backlight unit increase. The direct type backlight unit includes a light source and a reflective plate positioned opposite to the light source. More specifically, the light source includes a cylindrical fluorescent lamp or a plurality of fluorescent lamps arranged at fixed intervals. The reflective plate is provided to irradiate light emitted from the light source to an LCD panel uniformly. According to the related art, the reflective plate refracts light rays based on the number of light sources and the interval between the light sources (for reference, Japanese Patent Publication Nos. 05-10223 and 05-159609).

However, the backlight unit according to the related art requires high light efficiency and great luminance intensity. Since only polarized rays of P-wave emitted from the light source and S-wave of linearly polarized rays are used for irradiating the LCD device, light efficiency is low. Especially when an inclined angle of the reflective plate is large, there is a decrease in P-wave so that the light efficiency is further deteriorated. Accordingly, the rays irradiated to an LCD device by the backlight unit according to the related art are insufficient and the backlight unit according to the related art has poor light efficiency.

SUMMARY OF THE INVENTION

Accordingly, the present invention is directed to a backlight unit of a liquid crystal display device, and reflective means therein that substantially obviate one or more of the problems due to limitations and disadvantages of the related art.

An object of the present invention is to provide a backlight unit of a liquid crystal display device, and reflective means therein that have miniature sloping reflective surfaces of various angles to improve light efficiency.

Additional advantages, objects, and features of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the backlight unit of a liquid crystal display (LCD) device includes a light source and a reflective means, the reflective means having a plurality of sloping reflective surfaces for reflecting light emitted from the light source to a light-irradiation surface of a liquid crystal panel at an angle of about 30° or less with respect to a line perpendicular with the light-irradiation surface of the liquid crystal panel.

In another aspect, the reflective device for a backlight unit of a liquid crystal display device includes a plurality of sloping reflective surfaces for reflecting light emitted from a light source to a light-irradiation surface of a liquid crystal panel at an angle of about 30° or less with respect to a line perpendicular with the light-irradiation surface of the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
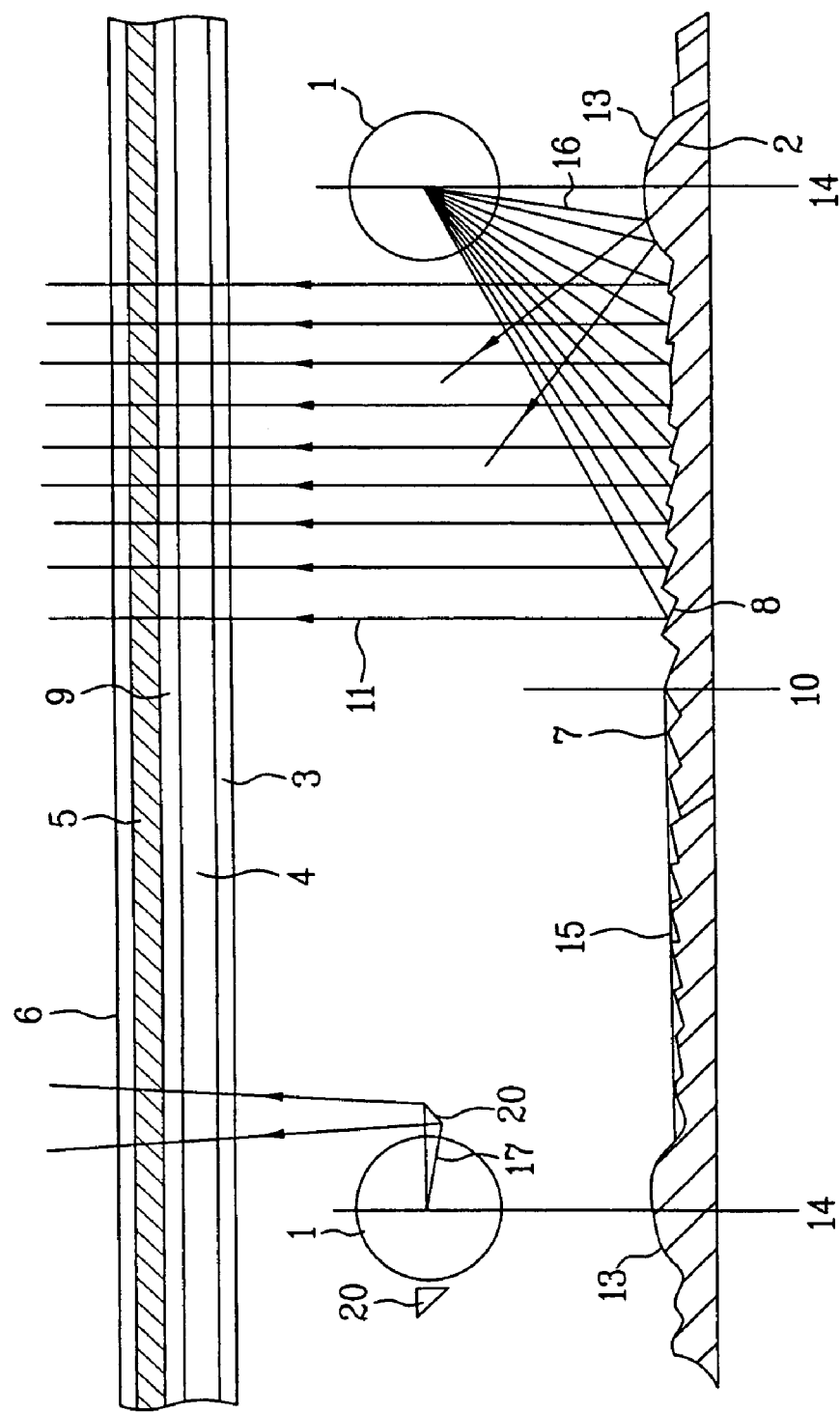
FIG. 1 is a cross-sectional schematic view of a backlight unit of a liquid crystal display device according to an embodiment of the present invention.

FIG. 1 is a cross-sectional schematic view of a backlight unit of a liquid crystal display device according to an embodiment of the present invention. In FIG. 1, a backlight unit of a liquid crystal display device may include a light source 1 and a reflective means 2. The backlight unit may irradiate light to a liquid crystal display (LCD) panel 5. The liquid crystal display panel 5 may include a light-diffusion and/or luminance-improvement film 3, and a first reflective-type polarizing plate 4 formed on a lower surface. A second reflective-type polarizing plate 6 also may be formed on an upper surface of the liquid crystal display panel 5. The first reflective-type polarizing plate 4 and the second reflective-type polarizing plate 6 may transmit linearly polarized rays of P-wave and may reflect linearly polarized rays of S-wave.

In addition, the light source 1 of the backlight unit may include one or more cylindrical cold cathode fluorescent lamps (CCFL). The reflective means 2 may have a generally-planar reflective surface 7. Further, the reflective surface 7 may include a plurality of miniature sloping reflective surfaces 8. The sloping reflective surfaces 8 may be continuous and may have a Fresnel prism shape with a width of about 10 μm to 1000 μm. For a large-sized LCD device having three or more light sources 1 at an interval, e.g., an interval of about 50 mm, the generally-planar reflective surface 7 may be repetitively positioned to correspond to each of the light sources 1, thereby providing high luminance.

Further, the sloping reflective surfaces 8 may include an inclined angle $\theta 1$ being within a predetermined range for reflecting light emitted from the light source 1 to a light-irradiation surface 9 of the LCD panel 5 perpendicularly or at an angle of about 30° or less with respect to a line perpendicular to the light-irradiation surface 9. For example, as the sloping reflective surfaces 8 are located more distant from the light source 1, the inclined angle $\theta 1$ of the sloping reflective surfaces 8 may gradually increase.

When a plurality of light sources are employed, for example, two light sources are shown in FIG. 1, the sloping reflective surfaces 8 located close to the midpoint 10 may have an isosceles triangular shape for respectively reflecting light emitted from the two light sources. Moreover, a line 15 connecting vertexes of the sloping reflective surfaces 8 may be provided upwardly since the two sides of the line 15 with respect to the midpoint 10 may be different from each other. Thus, the line 15 connecting the vertexes of the sloping reflective surfaces 8 may be shaped for covering the sloping reflective surfaces 8.

Since the sloping reflective surfaces 8 having a minute width are connected with one another, rays of light 11 may be reflected perpendicularly to the light-irradiation surface 9 and the light rays 11 may be parallel to each other along a width-wise direction of the LCD panel 5. As a result, the backlight unit may uniformly reflect light emitted from the isotropic light source 1 in a desired direction, thereby providing higher and more uniform transmittance of linearly polarized light rays of P-wave for operating the LCD panel 5 and improving light efficiency of the light source 1.

When the perpendicular rays 11 are described in terms of a cross-sectional parabolic curve, the inclined angle $\theta 1$ of the sloping reflective surface 8 may be determined by dividing the parabolic curve into portions corresponding to the number of the sloping reflective surfaces, detecting a tangent line at a central point of the divided parts, and detecting a crossing angle of the tangent line and a horizontal line thereof. The parabolic curve may be formed of a hyperbolic curve or a similar elliptical curve. In addition, by the sloping reflective surface 8, slanting rays 12 may be reflected to be incident the light-irradiation surface 9 at an angle $\theta 2$ of about 30° or less to the line perpendicular with the light-irradiation surface 9 to provide a large amount of rays to the central portion between the two light sources 1, thereby preventing luminance mura.

Figure 2:
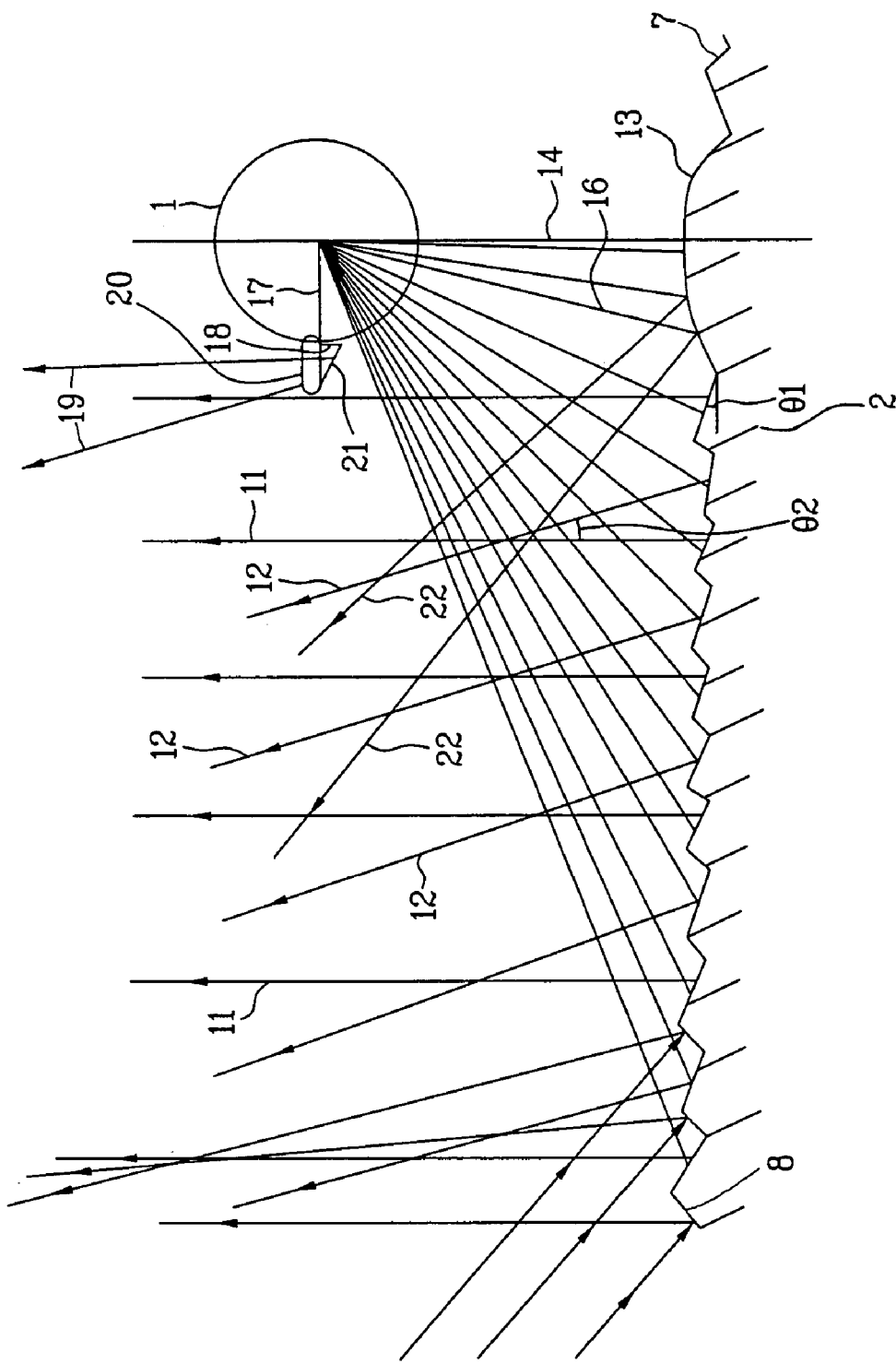
FIG. 2 is an enlarged view of a region of the backlight unit of FIG. 1.

FIG. 2 is an enlarged view of a region of the backlight unit of FIG. 1. As shown in FIG. 2, the reflective surface 7 may include the miniature sloping reflective surfaces 8 to alternatively reflect the perpendicular rays 11 and the slanting rays 12, thereby improving polarizing efficiency and preventing luminance mura. In particular, the inclined angle $\theta 1$ of the sloping reflective surfaces 8 may be altered to alternatively form the perpendicular rays 11 and the slanting rays 12.

In addition, the reflective surface 7 may include a reflective part 13 directly below the light source 1. The reflective part 13 may be formed to avoid reflecting rays 16 emitted from the light source 1 perpendicularly back to the light source 1. In particular, the reflective part 13 may have a width being the same as a diameter of the light source 1. In addition, the reflective part 13 may have a hemispherical shape, a convex shape or a concave shape of a same diameter as the light source, e.g., 8 mm. As a result, the rays 16 may be reflected away from the light source and may be used to operate the LCD device to thereby avoid blocking of light by the light source 1. In particular, the reflective part 13 may reflect the rays 16 to reflected rays 22 irradiating a portion of the light-irradiation surface 9 (shown in FIG. 1) between the two light sources 1.

The sloping reflective surfaces 8 and the reflective part 13 may be formed as a plurality of continuous triangular prisms connecting to a semi-cylindrical shape. When forming the reflective means 2, a mold corresponding to the shape of the sloping reflective surfaces 8 and the reflective part 13 may be formed of a plastic material such as polystyrene by injection, and a metallic material such as aluminum (Al) may be deposited or plated on the mold. Alternatively, white pigments may be coated on the mold to form the reflective surface. In addition, as the width of the sloping reflective surfaces 8 decreases, it becomes even more effective in reflecting light but the fabrication of the sloping reflective surface becomes more complex. Thus, the sloping reflective surfaces 8 may preferably have a width of about 20 μm to 500 μm. For example, the sloping reflective surfaces 8 may have a width of about 500 μm.

As a result, while the light source 1 may directly emit light perpendicularly to the light-irradiation surface 9 of the liquid crystal display panel 5 (shown in FIG. 1), the reflective means 2 including the sloping reflective surfaces 8 and the reflective part 13 further reflect the remaining 50% or more light emitted from the light source 1 into the perpendicular rays 11 and the slanting rays 12 to more efficiently irradiate the LCD panel 5.

Also, a prism reflection mirror 20 having an incident surface 18 and a reflective surface 21 may be fixed at both sides of the light source 1 by an adhesive. The prism reflection mirror 20 may have a right-triangle shape (right-triangular prism shapes arranged in the length direction of the light source 1). As a result, rays 17 emitted from the left and right sides of the light source 1 may be upwardly reflected by the prism reflection mirror 20 to perpendicularly or slantingly reflect rays 19 onto the light-irradiation surface 9 of the LCD panel 5 (shown in FIG. 1) to further improve light efficiency of the light source 1. In addition, other reflective means, such as a mirror having only a reflective surface 21, may be employed instead of the prism reflection mirror 20.

The prism reflection mirror 20 may be formed at the left side of the light source 1. In addition, the prism reflection mirror may be omitted or may be formed at both sides of the light source 1 as shown in FIG. 1. Further, it is not necessary to provide the prism reflection mirrors 20 to all light sources 1 and to both sides thereof. Alternatively, the prism reflection mirrors may be provided at one side of the left-sided light source and one side of the right-sided light source.

Figure 3:
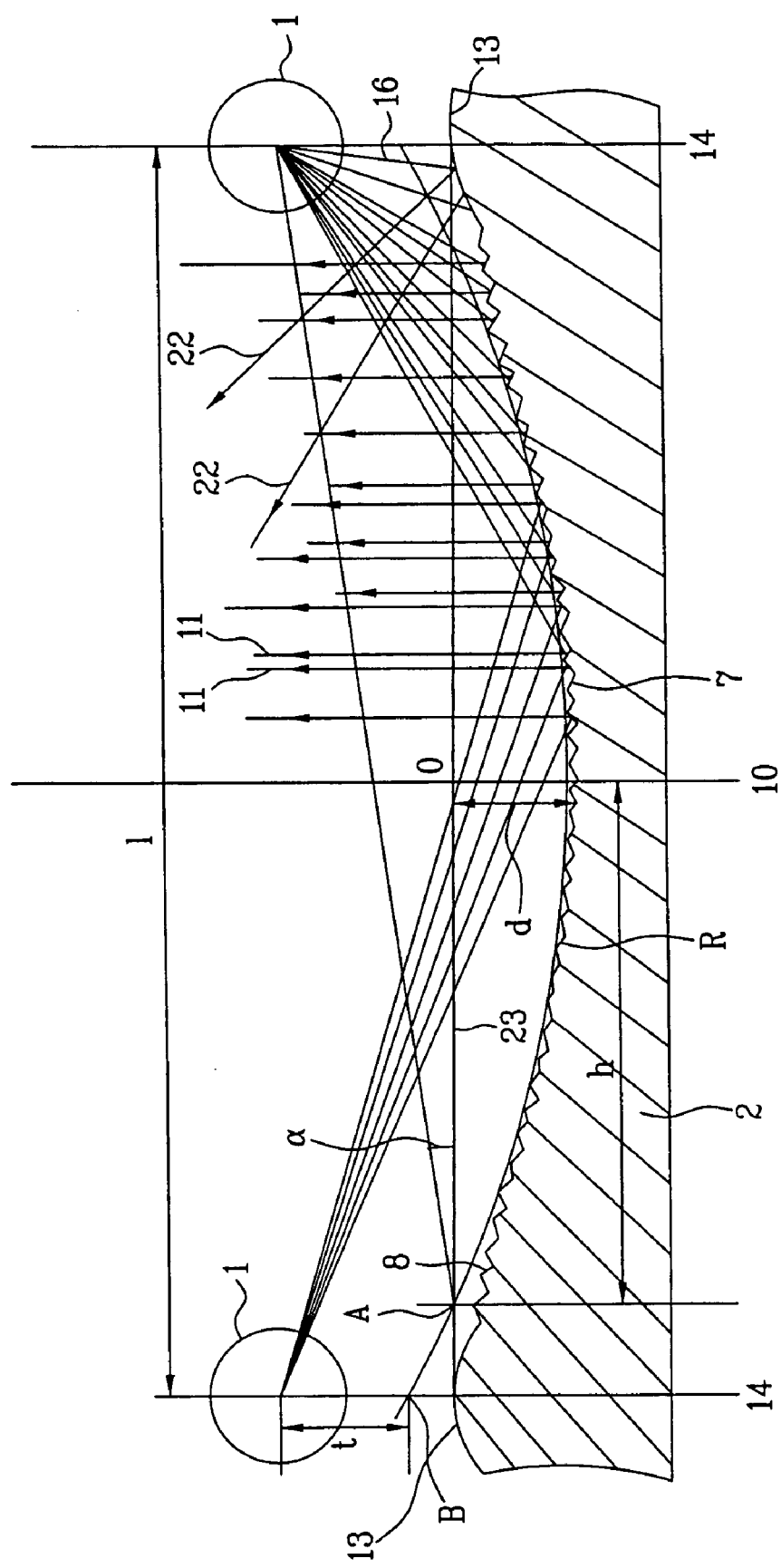
FIG. 3 is a cross-sectional schematic view of a backlight unit according to another embodiment of the present invention.

FIG. 3 is a cross-sectional schematic view of a backlight unit according to another embodiment of the present invention. In FIG. 3, a backlight unit may include two light sources 1 and a reflective means 2 for irradiating light to a liquid crystal display panel (not shown). The light sources 1 of the backlight unit may include one or more cold cathode fluorescent lamp (CCFL), and prism reflection mirrors (not shown) may be formed at both sides of the light source 1. The reflective means 2 may have a generally-curved reflective surface 7 between the two light sources 1.

The reflective surface 7 may include a plurality of miniature sloping reflective surfaces 8. The sloping reflective surfaces 8 may be continuous and may have an isosceles triangular shape along the curve of the reflective surface 7. In addition, the reflective surface 7 may include a reflective region 13 directly below each of the light sources 1. The reflective region 13 may have a width the same as a diameter of the light source 1 and may have a curved surface of a same curvature ratio as the light source 1.

The radius (R) of the curved surface of the reflective surface 7 may be calculated based on a distance (1) between the two light sources 1, a distance (h) from a central portion 10 between the two light sources 1 to the last of the sloping reflective surfaces 8, an incident angle ($\alpha$) of rays emitted from the light source to the farthest point (A) of the reflective surface 7 from the light source 1, a distance (t) from a crossing point (B) between the arc and an optical axis 14 to the light source 1, and a depth (d) by a crossing point (0) of a line 23 connecting the farthest both sloping reflective surfaces 8 and the central portion 10 to the reflective surface 7.

That is, 't' is calculated by 'COSEC $\alpha \approx 1/t$' after obtaining the incident angle ($\alpha$). Then, 'd' is calculated by 'd=1.3(1/t)', and 'R' is calculated in the following equation 1 using 'd' and 'h', whereby the arc-shaped reflective surface 7 is obtained by drawing the circle of the radius (R).

$$R = \frac{d}{2} + \frac{h^2}{2d} \qquad \text{equation 1}$$

For example, if '$\alpha$=8°', '1=50 mm', and 'h=21 mm', 'COSEC 8=7.185', 't=6.959 mm', 'd=9.341 mm' and 'R=28.28 mm'. Accordingly, the curve surface having the radius of 'R=28.28 mm' may be obtained. Then, the plurality of triangular sloping reflective surfaces 8 of Fresnel prism shape may be sequentially formed along the curve surface wherein each of the plurality of triangular sloping reflective surfaces 8 has a width of 500 μm.

As compared with the previously-discussed generally-planar reflective surface 7, the generally-curved reflective surface 7 prevents rays emitted from the light source 1 from being blocked at the uppermost portion of the prism-shaped sloping reflective surfaces 8, thereby reflecting rays even more effectively. As a result, the amount of rays 11 perpendicular to a light-irradiation surface of a LCD panel increases, thereby further improving efficiency in using the rays emitted from the light. source 1.

By forming the reflective means having the plurality of sloping reflective surfaces, it is possible to reflect light emitted from an isotropic light source parallel to the optical axis of the light source, so that rays may be reflected perpendicularly onto a liquid crystal display panel. Accordingly, the backlight unit of the LCD device of the present invention reflects rays emitted from the light source to a light-irradiation surface of the LCD device perpendicularly and avoids ray-blockage by the light source, thereby improving light efficiency and increasing luminance uniformity.

It will be apparent to those skilled in the art that various modifications and variations can be made in the backlight unit of liquid crystal display device and reflective means therein of the present invention without departing from the spirit or scope of the invention. Thus, it is intended that the present invention covers the modifications and variations of this invention provided they come within the scope of the appended claims and their equivalents.

What is claimed is:

1. A backlight unit of a liquid crystal display device, comprising:
   a plurality of light sources; and
   a reflective member, the reflective member including a plurality of reflective elements, each reflective element having at least two sloping surfaces, the reflective elements being connected together and formed to reflect light emitted from at least two of the plurality of light sources to a light-irradiation surface of a liquid crystal panel at an angle of about 30° or less with respect to a line perpendicular with the light-irradiation surface of the liquid crystal panel wherein each reflective element has a first sloping surface and a second sloping surface, each first sloping surface of the reflective elements having an inclined angle that is different from the first sloping surface of an adjacent reflective element, and each second sloping reflective surface having an inclined angle that is different from the second sloping surface of adjacent reflective elements.

2. The backlight unit of claim 1, wherein the reflective elements of the reflective member have a cross section of a triangular shape.

3. The backlight unit of claim 1, wherein the reflective member has a generally-planar reflective surface and the reflective elements are formed as miniature sloping surface portions of the generally-planar reflective surface.

4. The backlight unit of claim 1, wherein the reflective member has a generally-concave reflective surface and the reflective elements are formed as miniature sloping portions of the generally-concave reflective surface.

5. The backlight unit of claim 4, wherein at least one of the plurality of light sources is located above a portion of the generally-concave surface located nearest to the liquid crystal panel.

6. The backlight unit of claim 1, wherein the reflective member further includes a reflective part formed directly below at least one of the plurality of light sources, the reflective part having a shape different from the reflective elements.

7. The backlight unit of claim 6, wherein the reflective part includes a curved shape having a radius that is substantially the same as a radius of the light source located above the curved shape.

8. The backlight unit of claim 6, wherein the reflective part is configured to reflect substantially all of the light incident on the reflective part directly to the light irradiation surface.

9. A backlight unit of a liquid crystal display device, comprising:
   a light source;
   a first reflective means, the reflective means including a plurality of sloping reflective surfaces for reflecting light emitted from the light source to a light-irradiation surface of a liquid crystal panel at an angle of about 30° or less with respect to a line perpendicular with the light-irradiation surface of the liquid crystal panel; and a second reflective means formed adjacent to the light source for reflecting light emitted parallel from the light source with respect to the light-irradiation surface of the liquid crystal panel.

10. The backlight unit of claim 9, where the second reflective means includes a prism reflection mirror for reflecting light incident thereon onto the light-irradiation surface at an angle of about 30° or less with respect to the line perpendicular with the light-irradiation surface of the liquid crystal panel.

11. A reflective device for a backlight unit of a liquid crystal display device, comprising:

a plurality of reflective elements, each reflective element having at least two sloping surfaces, the reflective elements being connected together and formed to reflect light emitted from at least two light sources to a light-irradiation surface of a liquid crystal panel at an angle of about 30° or less with respect to a line perpendicular with the light-irradiation surface of the liquid crystal panel wherein each reflective element has a first sloping surface and a second sloping surface, each first sloping surface of the reflective elements having an inclined angle that is different from the first sloping surface of an adjacent reflective element and each second sloping reflective surface having an inclined angle that is different from the second sloping surface of adjacent reflective elements.

12. The reflective device of claim 11, wherein the reflective elements have a cross section of a triangular shape.

13. The reflective device of claim 11, wherein the reflective device includes a generally-planar reflective surface and the reflective elements are formed as miniature sloping portions of the generally-planar reflective surface.

14. The reflective device of claim 11, wherein the reflective device includes a generally-concave reflective surface and the reflective elements are formed as miniature sloping portions of the generally-concave reflective surface.

15. The reflective device of claim 14, wherein the reflective device is configured to accommodate at least one of a plurality of light sources to be located above a portion of the generally-concave surface located nearest to the liquid crystal panel.

16. The reflective device of claim 11, further comprising a reflective part formed directly below the light source, the reflective part having a shape different from the reflective elements.

17. The reflective device of claim 16, wherein the reflective part includes a curve shape having a radius that is substantially the same as a radius of the light source located above the curved shape.

18. The reflective device of claim 16, wherein the reflective part is configured to reflect substantially all of the light incident on the reflective part directly to the light irradiation surface.

* * * * *